J. KIRBY.
ELECTRIC REVOLUTION METER FOR INTERNAL COMBUSTION ENGINES.
APPLICATION FILED JAN. 26, 1917.

1,241,993.

Patented Oct. 2, 1917.

WITNESSES
Frederick Wahl.

INVENTOR
J. Kirby.
BY
ATTORNEYS

UNITED STATES PATENT OFFICE.

JOHN KIRBY, OF NEW YORK, N. Y.

ELECTRIC REVOLUTION-METER FOR INTERNAL-COMBUSTION ENGINES.

1,241,993.

Specification of Letters Patent.

Patented Oct. 2, 1917.

Application filed January 26, 1917. Serial No. 144,797.

*To all whom it may concern:*

Be it known that I, JOHN KIRBY, a subject of the King of Great Britain, and a resident of the city of New York, borough of Manhattan, in the county and State of New York, have invented a new and Improved Electric Revolution-Meter for Internal-Combustion Engines, of which the following is a full, clear, and exact description.

This invention relates to a revolution meter especially adapted for indicating the revolutions per minute of an internal combustion engine, the meter being designed for use in connection with automobiles.

A more specific object of the invention is the provision of an instrument of the class described which is adapted to be connected with the ignition circuit of an automobile so as to indicate by the rapidity of the current impulses the revolutions of the engine, the scale of the device being calibrated according to whether the instrument is used in connection with a single or multiple cylinder engine.

A specific object of the invention is the provision of an energizing element composed of two oppositely wound coils normally balanced and connected in shunt with each other in an ignition circuit of an engine, there being in series with the respective coils a reactance and a resistance both of the same ohmic value, whereby upon certain low speeds of the engine there will be no magnetic unbalance of the coils and the armature will not move, but under high speeds the reactance retards the flow of current so that the coils become unbalanced magnetically and the armature will move and carry with it the needle, which in connection with the dial will indicate the speed of the engine.

With such objects in view, and others which will appear as the description proceeds, the invention comprises various novel features of construction and arrangement of parts which will be set forth with particularity in the following description and claim appended hereto.

In the accompanying drawings, which illustrate one embodiment of the invention and wherein similar characters of reference indicate corresponding parts in all the views, Figure 1 is a sectional view of the instrument;

Figure 1:
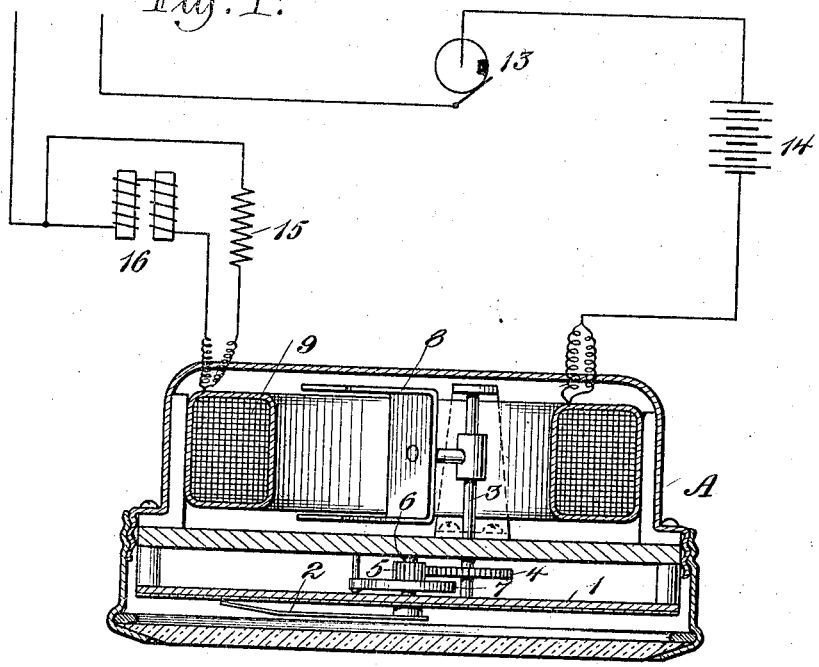
Figure 2:
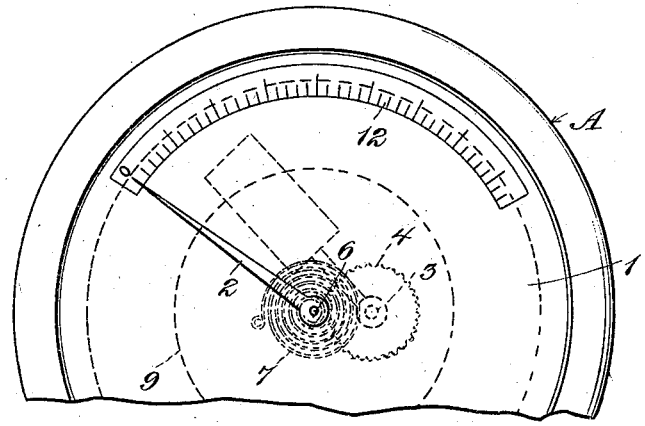
Fig. 2 is a front view with a portion broken away.
Figure 3:
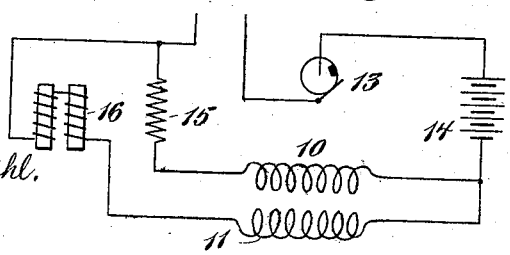
Fig. 3 is a diagrammatic view.

Referring to the drawings, A designates a casing of any suitable construction in which is mounted a dial plate 1 over which moves a needle or hand 2 that is driven from an armature-carrying shaft 3 through a gear wheel 4 and pinion 5, the latter being mounted on the needle shaft 6, to which is connected the needle-returning spring 7. The armature 8 on the shaft 3 is of U-form and is adapted to straddle the magnetic field element or winding 9 which is of annular form with its axis to one side of the armature-carrying shaft 3. The energizing winding is made up of two coils 10 and 11 which are of the same number of turns but oppositely wound so that when current of equal strength flows through both coils they will neutralize each other and produce no magnetic effect. When the magnetic balance of the two coils is disturbed the armature will be moved so as to cause the needle 2 to swing over the scale 12, Fig. 2.

The instrument is adapted to be connected with an ignition circuit of which the make-and-break device 13 and source of current 14 are shown. The two coils 10 and 11 of the instrument are connected in parallel relation with one side of the ignition circuit, and in series with the coil 10 is a resistance 15, and in series with the other coil is a reactance 16, both of which are connected with the other side of the ignition circuit. In other words, there are two shunts formed in the ignition circuit which are of the same ohmic value and which are normally magnetically balanced. The speed of the engine having a definite relation to the make-and-break of the ignition circuit, it can be determined by means of the armature under the magnetic influence of the winding 9. At low speeds substantially the same amount of current flows through both coils 10 and 11, but at high speeds the reactance cuts down the flow of current through the coil 11, so that the two sections of the winding 9 become unbalanced and the armature will move and cause the needle to indicate the speed at which the engine crank shaft is revolving. In the diagram shown in Fig.

3 an ignition circuit is adapted for a single cylinder engine and the scale 12 will be calibrated accordingly, but with a multiple cylinder engine the current impulses will be more frequent for the same speed and the scale will be calibrated differently. The instrument can obviously be used in connection with an ignition magneto.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claim.

Having thus described my invention, I claim as new and desire to secure by Letters Patent:

The combination with an ignition circuit of an internal combustion engine, of a revolution meter comprising an armature, a needle connected therewith, a field element magnetically related to the armature and composed of two oppositely-wound normally balanced coils each having a terminal connected with the ignition circuit, a resistance connected with one coil, a reactance connected with the other coil, and the said resistance and reactance being connected with the ignition circuit and of the same ohmic resistance, whereby the difference in the flow of current through the coils will move the armature needle to indicate the speed of the engine.

JOHN KIRBY.